(12) United States Patent
Giulietti

(10) Patent No.: US 10,872,180 B2
(45) Date of Patent: Dec. 22, 2020

(54) COMPLEX FEATURE CLONING IN ADDITIVE MANUFACTURING DATASETS

(71) Applicant: Hamilton Sundstrand Corporation, Charlotte, NC (US)

(72) Inventor: Diana Giulietti, Tariffville, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 652 days.

(21) Appl. No.: 15/411,599

(22) Filed: Jan. 20, 2017

(65) Prior Publication Data

US 2018/0210996 A1 Jul. 26, 2018

(51) Int. Cl.
| | |
|---|---|
| *G06F 30/17* | (2020.01) |
| *G06T 9/00* | (2006.01) |
| *G06F 30/00* | (2020.01) |
| *G06F 119/18* | (2020.01) |

(52) U.S. Cl.
CPC .............. *G06F 30/17* (2020.01); *G06F 30/00* (2020.01); *G06T 9/001* (2013.01); *G06F 2119/18* (2020.01)

(58) Field of Classification Search
CPC .. G06F 17/5086; G06F 17/50; G06F 2217/12; G06T 9/001
USPC .......................................................... 703/2
See application file for complete search history.

(56) References Cited

U.S. PATENT DOCUMENTS

| | | | |
|---|---|---|---|
| 5,596,504 A | 1/1997 | Tata et al. | |
| 9,844,917 B2 * | 12/2017 | Burhop | G05B 19/4099 |
| 10,201,940 B2 * | 2/2019 | Hayes | B33Y 50/00 |
| 2013/0103369 A1 * | 4/2013 | Huynh | G06F 17/5018 703/2 |
| 2013/0144566 A1 | 6/2013 | De Biswas | |
| 2014/0324204 A1 | 10/2014 | Vidimce et al. | |
| 2014/0340393 A1 | 11/2014 | Cai et al. | |

(Continued)

FOREIGN PATENT DOCUMENTS

| | | |
|---|---|---|
| EP | 2808810 A1 | 12/2014 |
| WO | 2013067327 A2 | 5/2013 |
| WO | 2014207454 A1 | 12/2014 |

OTHER PUBLICATIONS

Cut, copy, and paste—Wikipedia, https://en.wikipedia.org/wiki/Cut,_copy,_and_paste accessed on Nov. 24, 2019, date for features of teaching 1983, pp. 1-7. (Year: 1983).*

(Continued)

*Primary Examiner* — Justin C Mikowski
(74) *Attorney, Agent, or Firm* — Cantor Colburn LLP

(57) ABSTRACT

A computer-implemented method for generating a manufacturing dataset having cloned geometric features for an additive manufacturing process includes identifying, via a processor, a repeating design feature in a first manufacturing dataset that defines a three-dimensional workpiece. The method further includes determining, via the processor, a processing cost or benefit for cloning the repeating design feature, and generating, via the processor, a second dataset having with repeating design feature isolated responsive to the determined processing benefit. The method includes generating, via the processor, a third dataset from the first manufacturing dataset. The third dataset that replaces the repeating design feature with a reference to the second dataset having the repeating design feature.

20 Claims, 3 Drawing Sheets

(56) References Cited

U.S. PATENT DOCUMENTS

2016/0086376 A1* 3/2016 Tang .................. G06T 17/20
345/420
2016/0107388 A1 4/2016 Chopra et al.

OTHER PUBLICATIONS

How to Copy and Paste SOLIDWORKS Features by Javelin Technologies (htttps://blogs.solidworks.com/tech/author/javelin-technologies-2) Aug. 11, 2016, pp. 1-8. (Year: 2016).*
New feature: Smart duplicate Published on—Aug. 8, 2012 by shinotanaka, https://blog.tinkercad.com/2012/08/08/new-feature-smart-duplicate, pp. 1-6. (Year: 2012).*
European Search Report for Application No. 18152404.2-1224, dated May 29, 2018, 21 pages.
Shikhare, D, et al. "Compression of large 3D engineering models using automatic discovery of repeating geometric features". Proceedings of the Vision Modeling and Visualization Conference 2001, Stuttgart, Germany, Nov. 21-23, 2001, pp. 233-240.

\* cited by examiner

COMPLEX FEATURE CLONING IN ADDITIVE MANUFACTURING DATASETS

BACKGROUND

Exemplary embodiments pertain to the art of additive manufacturing, and more particularly to optimizing additive manufacturing datasets with complex feature cloning.

Additive manufacturing processes such as selective laser sintering (SLS) use a high power laser (for example, a carbon dioxide laser) to fuse small particles of plastic, metal, ceramic, or glass powders into a mass that has a desired three-dimensional shape. The laser selectively fuses powdered material by scanning cross-sections generated from a three dimensional (3-D) digital description (model) of the part (for example from a CAD file or scan data) on the surface of a powder bed. After each cross-section is scanned, the powder bed is lowered by one layer thickness, a new layer of material is applied on top, and the process is repeated until the part is completed. The model of the part is defined with one or more datasets that define workpiece geometry at each cross-section. The dataset describes the surface geometry of each respective layer with a raw unstructured triangulated surface by the unit normal and vertices of triangles using a 3-D Cartesian coordinate system. The dataset can become extremely complex in terms of file size when the workpiece features are highly complex.

Some workpieces may include several repeating units of design features. When the repeated design features include geometric details, considerable computational resources may be needed. The overall size of the dataset used to manufacture the part can become computationally difficult implement because of the volume of data. For example, when an additive manufacturing software slices a 3-D digital part model for an additive manufacturing build, it must assess every surface individually. Large parts with multiple complex features can become too cumbersome to processes.

It may be advantageous to optimize the additive manufacturing process with a system that makes repeated use of workpiece feature data (cloning). It may be advantageous to configure the system to identify features that repeat, determine whether a cloning process optimizes the dataset, and output new simplified datasets using one or more clones of the repeating feature to save processing resources.

BRIEF DESCRIPTION

Disclosed is a computer-implemented method for generating a manufacturing dataset having cloned geometric features for an additive manufacturing process. The method includes identifying, via a processor, a repeating design feature in a first manufacturing dataset that defines a three-dimensional workpiece. The method further includes determining, via the processor, a processing cost or benefit for cloning the repeating design feature, and generating, via the processor, responsive to the determined processing benefit. The second dataset has the repeating design feature isolated. The method includes generating, via the processor, a third dataset from the first manufacturing dataset. For each instance of the repeating design feature, the third dataset replaces the repeating design feature with a reference to the second dataset having the repeating design feature.

Also disclosed is a system for generating a manufacturing dataset having cloned geometric features for an additive manufacturing process. The system includes a processor configured to identify a repeating design feature in a first manufacturing dataset that defines a three-dimensional workpiece. The system also determines a processing cost or benefit for cloning the repeating design feature, and generates a second dataset with the repeating design feature isolated, responsive to the determined processing benefit. The system generates a third dataset from the first manufacturing dataset. For each instance of the repeating design feature, the third dataset replaces the repeating design feature with a reference to the second dataset having the repeating design feature.

A computer program product for generating a manufacturing dataset having cloned geometric features for an additive manufacturing process is also disclosed. The computer program product includes a computer readable storage medium storing program instructions. The program instructions are executable by a processor to cause the processor to perform a method. The method includes identifying, via a processor, a repeating design feature in a first manufacturing dataset that defines a three-dimensional workpiece. The method further includes determining, via the processor, a processing cost or benefit for cloning the repeating design feature, and generating, via the processor, responsive to the determined processing benefit. The second dataset has the repeating design feature isolated. The method includes generating, via the processor, a third dataset from the first manufacturing dataset. For each instance of the repeating design feature, the third dataset replaces the repeating design feature with a reference to the second dataset having the repeating design feature.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
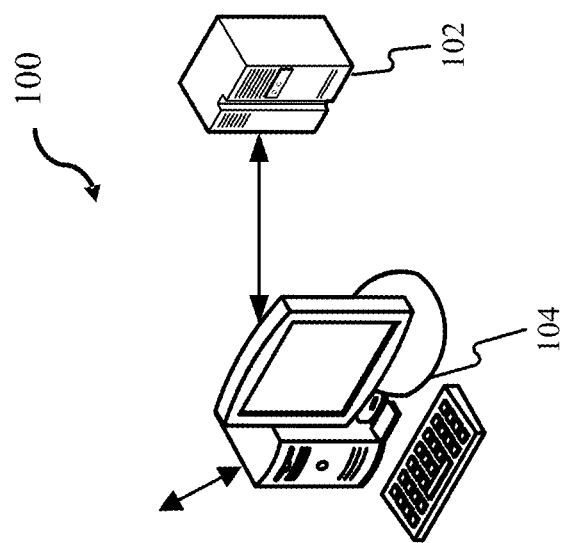
FIG. 1 is a diagram of an exemplary computing environment, according to an embodiment.

FIG. 1 is a diagram of an exemplary computing environment 100, according to an embodiment. Computing environment 100 includes a machine 102 for additive manufacturing. Machine 102 may be, for example, a selective laser sintering (SLS) machine, a fused deposition modeling (FDM) machine, a stereolithography (SLA) machine, or another machine for additive manufacturing processes. Machine 102 may include an integrated computer or be operatively connected to an auxiliary computer 104. Computer 104 and machine 102 may include similar computing features as computer 500 depicted with respect to FIG. 5.

Figure 2:
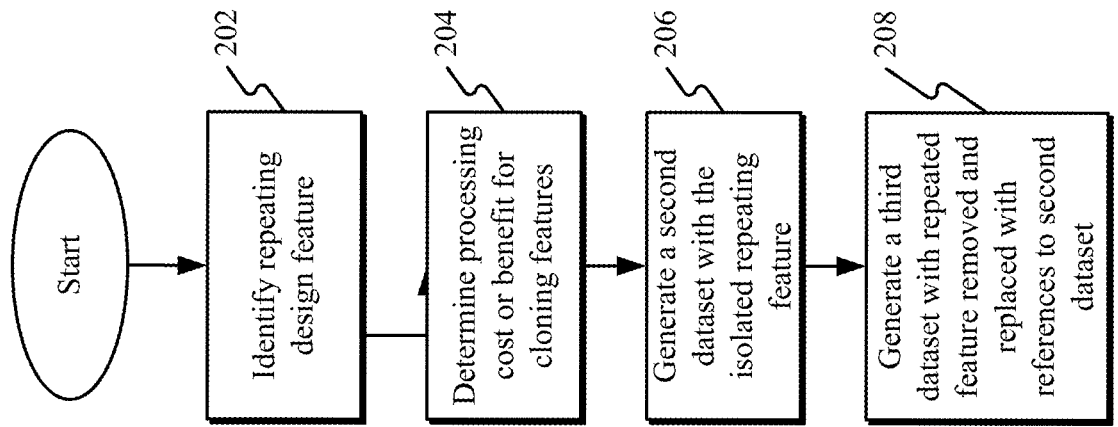
FIG. 2 is a flow diagram of a method for generating a dataset having cloned geometric features according to an embodiment.

FIG. 2 is a flow diagram of a method for generating a dataset configured for use in machine 102. Embodiments described herein may generate datasets having cloned geometric features. The generated datasets may be significantly smaller than the original manufacturing datasets having multiple instances the repeating features. Referring now to FIG. 2, at step 202, a system processor (e.g., processor 501 in FIG. 5) may identify a repeating design feature in a first manufacturing dataset that defines a three-dimensional workpiece.

According to one embodiment, processor 501 is configured to identify the repeating design feature in the first manufacturing dataset based on user input indicative of the repeating design feature. According to another embodiment, processor 501 is further configured to identify the repeating design feature in the first manufacturing dataset without user input indicative of the repeating design feature. Accordingly, processor 501 is configured evaluate the dataset for blocks of surface data having multiple surfaces with a particular size oriented with adjacent surfaces in a similar fashion. For instance, processor 501 may identify three surfaces A, B, and C, all adjacent to one another, and determine that three other surfaces D, E, and F, are adjacent to one another with an identical orientation with respect to one another as surfaces A, B, and C, but differing only in a relative location in the workpiece. Stated in a different way, processor 501 determines that surfaces A, B, and C are likely identical repeats of surfaces D, E, and F.

Processor 501 may determine whether the surfaces are actually identical. In other embodiments, processor 501 may map a surface A, to a surface D, and evaluate a difference in area between A and D. When the area difference is less than a predetermined threshold (e.g., 0.02%, etc.), processor 501 may map and compare similar adjacent surfaces in the detected instances of similar blocks of surface data, until processor 501 determines within a predetermined threshold of error that A, B, and C identify a complete feature, and D, E, and F, are a repeat instance of that complete feature. In some embodiments, processor 501 can identify a feature by surfaces positively matched to other surfaces in the workpiece. In other embodiments, processor may use splines, line lengths, relative distances between feature vertices, or other methods to match portions of repeating features.

At step 204, processor 501 may determine a processing cost or benefit for cloning the repeating design feature with respect to an unaltered (complete) manufacturing file. An example of a manufacturing file may be, for example, a .STL or the like. The processing cost or benefit is used to determine whether cloning the repeating feature will benefit the final output dataset by simplifying the instructions for building the part in machine 102. If the final instructions are larger with the cloned feature removed then the cloning is said to have a cost greater than the benefit. The processing cost or benefit is based on a geometric complexity of the repeating design feature indicated by three-dimensional surface information, and the design feature is repeated in a Z-axis respective to a Cartesian coordinate system. Processor 501 may compare the cost or benefit to a predetermined threshold value. For example, 20%, 30%, etc. According to one embodiment, the processing cost or benefit is based on a geometric complexity of the repeating design feature indicated by three-dimensional surface information. For example, a simple boss repeated twenty times in the X-Y plane of a Cartesian coordinate system may offer limited benefit compared to a complex geometry that is repeated, as shown in FIG. 3.

Figure 3:
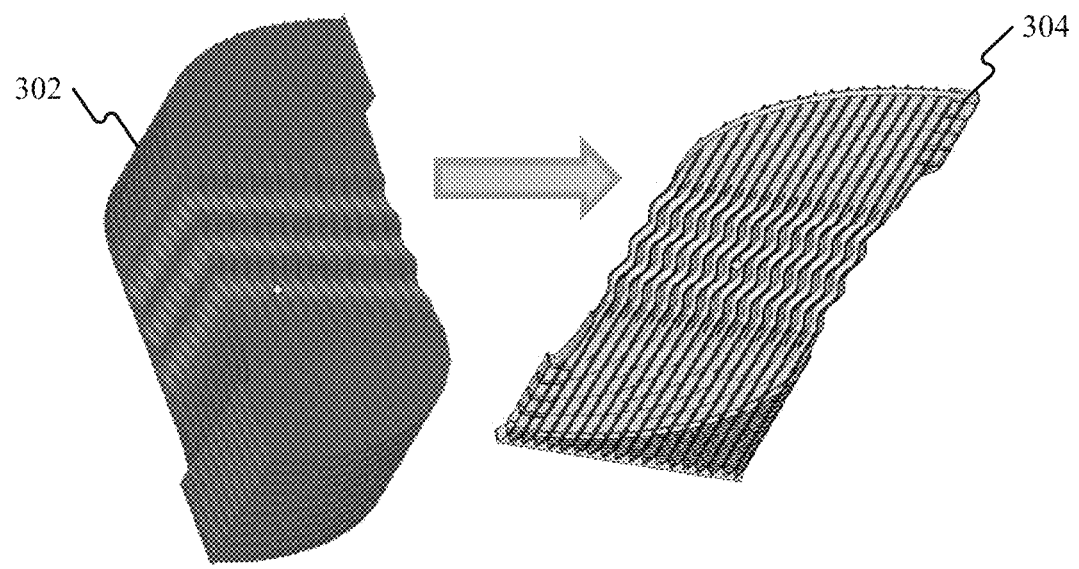
FIG. 3 is an exemplary workpiece having a cloned feature according to an embodiment.

Referring briefly to FIG. 3, exemplary workpiece 302 having a cloned feature 304 is depicted, according to an embodiment. Cloned feature 304 is repeated multiple times in the Z-direction of part 302. The geometry of the repeating design features 304 can take considerable computing power and storage to represent the complex 3-D surfaces and shapes. By multiplying repeating design feature 304 multiple times as show in workpiece 302, a dataset may become too large to manage by processor 501. Repeating feature 304 is repeated in the Z direction with respect to a flat orientation of workpiece 302.

Returning again to FIG. 2, processor 501 may determine a processing data requirement indicative of a volume of data storage necessary for the repeating design feature 304. Processor 501 may generate a count of a number of times the repeating design feature is repeated in the first manufacturing dataset, and evaluate a modified sample of the first manufacturing dataset having the repeating design feature removed. For example, a modified dataset may include design feature 304 removed, and instead include one or more placeholders that position that instance of the repeating feature relative to the workpiece. Processor 501 may generate placeholder(s) for each respective instance of the repeated design feature.

In the example of FIG. 3, the modified dataset may include a series of points or locations for orienting each of the design features 304. In the example of workpiece 302, the entire part can be represented using the repeating features exclusively, without any underlying structure between them. According to other embodiments, the modified dataset may be a workpiece body with the repeating features removed, and in their place, a point location or "placeholder" for each instance. Processor 501 may determine the processing cost or benefit by comparing the processing cost or benefit for cloning the repeating design feature 304 based on the processing data requirement, the count of the number of instances of the repeating design feature 304, and the modified sample of the first manufacturing dataset.

At step 206, processor 501 may generate a second dataset having the repeating design feature isolated responsive to the determined processing benefit. The second dataset includes information for the repeated design feature 304 in isolation, as shown in FIG. 3.

At step 208, processor 501 may generate a third dataset from the first manufacturing dataset. The third dataset replaces the repeating design feature with a reference to the second dataset that includes only the repeating design feature in isolation.

According to one embodiment, processor 501 may determine whether the repeating design feature is coterminous with an adjacent instance of the repeating design feature, and determine an overlap distance for the repeating design feature and the adjacent instance of the repeating design feature. In one aspect, processor 501 may request user input regarding the overlap distance, and receive the user input with which processor 502 determines the overlap. Processor 501 may generate the third dataset, responsive to determining that the repeating design feature is coterminous with the adjacent instance of the repeating design feature. The repeating design feature is coterminous with the adjacent instance when a first instance connects to a second instance in a particular way (at a specific point relative to the instance), and the same relative point in the second instance connects to the next sequential instance at the same relative point. The third dataset includes a reference location for the reference to the second dataset having the repeating design feature based on the overlap distance. The reference location may be, for example, Cartesian coordinates respective to an orienting location of the workpiece. In one embodiment, processor 501 is configured to generate the third dataset based on one or more user inputs indicative of an additive manufacturing process, an additive manufacturing material, and a finish tolerance.

Figure 4:
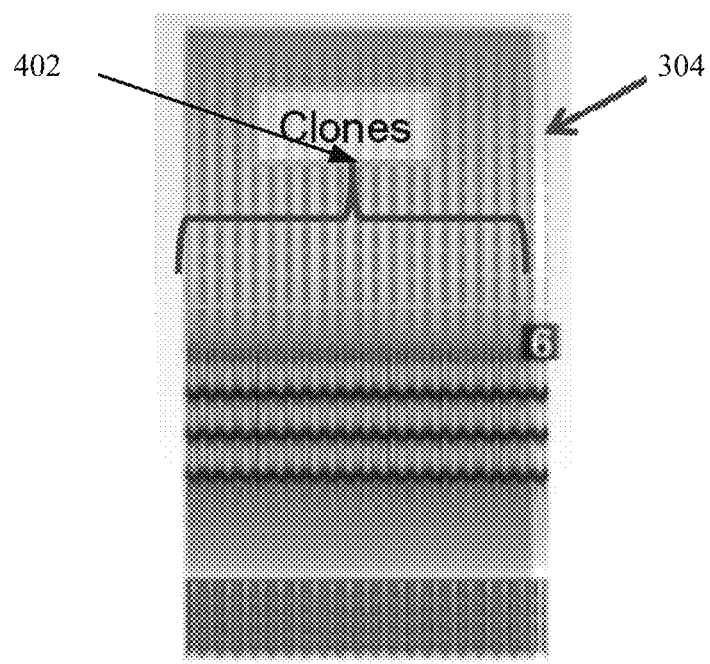
FIG. 4 is side view of the exemplary workpiece of FIG. 3 according to an embodiment.

FIG. 4 is side view of the exemplary workpiece of FIG. 3 according to an embodiment. As shown in FIG. 4, a portion of repeating feature 304 is coterminous with an adjacent clone shown immediately to the left. Clones 402 may be a series of repeating design features, where each respective portion of the clone is coterminous with the next adjacent clone in the same way as the previous instance.

Embodiments described herein may provide optimized additive engineering 3-D part build files by reducing the volume part information needed to build the part. In some instances, embodiments may optimize additive manufacturing of parts with multiple features that were cumbersome or impossible to processes by additive manufacturing machines due to part complexity.

Figure 5:
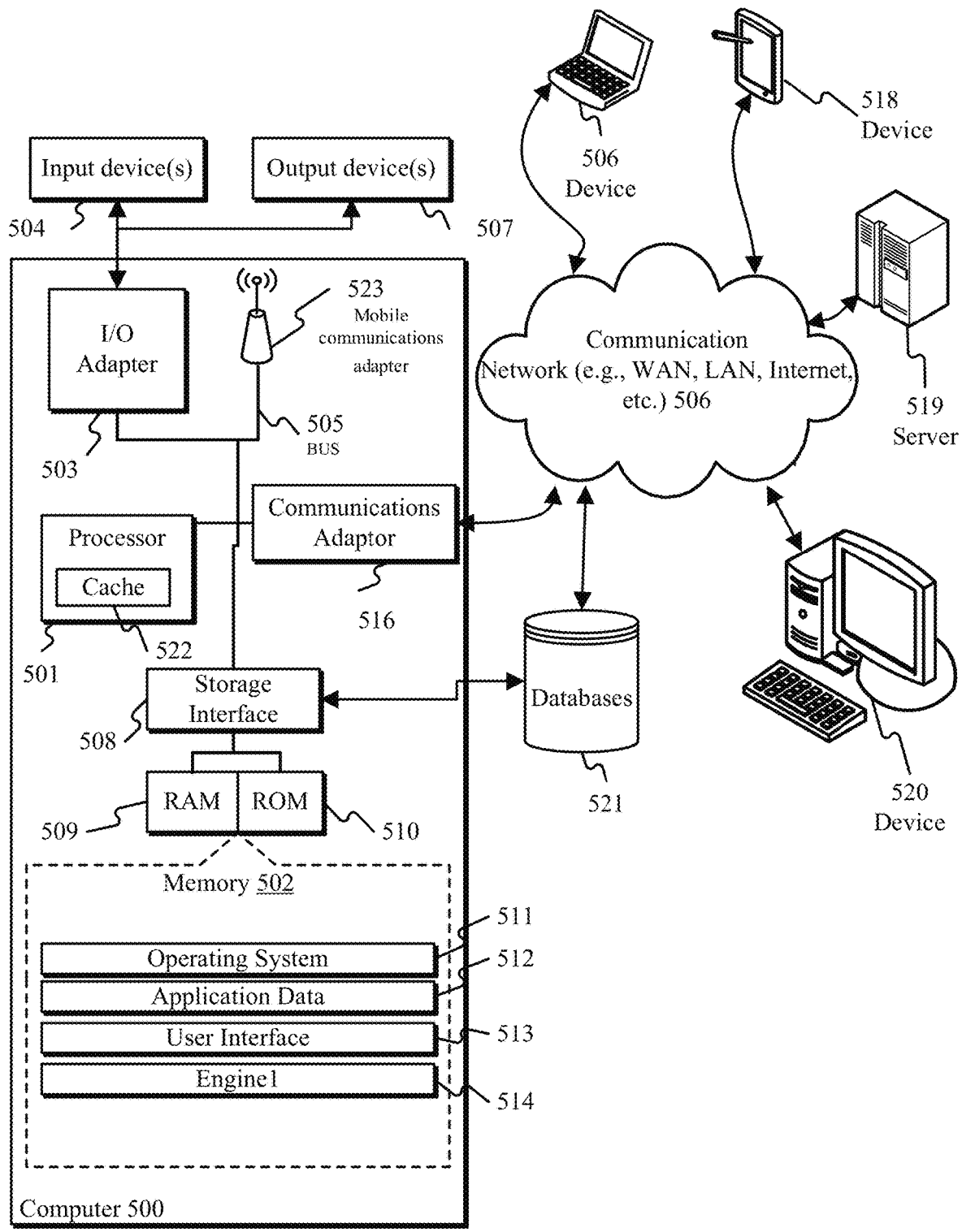
FIG. 5 is a system for generating a dataset having cloned geometric features according to an embodiment.

FIG. 5 is a system for generating a dataset having cloned geometric features according to an embodiment. FIG. 5 illustrates a block diagram of an exemplary computing environment and computer system 500 for use in practicing the embodiments described herein. The environment and system described herein can be implemented in hardware, software (e.g., firmware), or a combination thereof. In an exemplary embodiment, a hardware implementation may include a microprocessor of a special or general-purpose digital computer, such as a personal computer, workstation, minicomputer, or mainframe computer. Computer 500 therefore can embody a general-purpose computer. In another exemplary embodiment, the implementation can be part of a mobile device, such as, for example, a mobile phone, a personal data assistant (PDA), a tablet computer, etc.

As shown in FIG. 5, the computer 500 includes processor 501. Computer 500 also includes memory 502 communicatively coupled to processor 501, and one or more input/output adapters 503 that may be communicatively coupled via system bus 505. Memory 502 may be communicatively coupled to one or more internal or external memory devices via a storage interface 508. Communications adapter 516 may communicatively connect computer 500 to one or more networks 506. System bus 505 may communicatively connect one or more user interfaces via input/output (I/O) adapter 503. I/O adapter 503 may connect a plurality of input devices 504 to computer 500. Input devices may include, for example, a keyboard, a mouse, a microphone, a sensor, etc. System bus 505 may also communicatively connect one or more output devices 507 via I/O adapter 503. Output device 507 may include, for example, a display, a speaker, a touchscreen, etc.

Processor 501 is a hardware device for executing program instructions (aka software), stored in a computer-readable memory (e.g., memory 502). Processor 501 can be any custom made or commercially available processor, a central processing unit (CPU), a plurality of CPUs, for example, CPU 501a-501c, an auxiliary processor among several other processors associated with the computer 500, a semiconductor based microprocessor (in the form of a microchip or chip set), or generally any device for executing instructions. Processor 501 can include a cache memory 522, which may include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 522 may be organized as a hierarchy of more cache levels (L1, L2, etc.).

Processor 501 may be disposed in communication with one or more memory devices (e.g., RAM 509, ROM 510, one or more external databases 521, etc.) via a storage interface 508. Storage interface 508 may also connect to one or more memory devices including, without limitation, one or more databases 521, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives may be, for example, a drum, a magnetic disc drive, a magneto-optical drive, an optical drive, a redundant array of independent discs (RAID), a solid-state memory device, a solid-state drive, etc. Variations of memory devices may be used for implementing, for example, list all databases from other figures.

Memory 502 can include random access memory (RAM) 509 and read only memory (ROM) 510. RAM 509 can be any one or combination of volatile memory elements (e.g., DRAM, SRAM, SDRAM, etc.). ROM 510 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 502 may incorporate electronic, magnetic, optical, and/or other types of non-transitory computer-readable storage media. Memory 502 may also be a distributed architecture, where various components are situated remote from one another, but can be accessed by processor 501.

The instructions in memory 502 may include one or more separate programs, each of which may include an ordered listing of computer-executable instructions for implementing logical functions. In the example of FIG. 5, the instructions in memory 502 may include an operating system 511. Operating system 511 can control the execution of other computer programs and provides scheduling, input-output control, file and data management, memory management, and communication control and related services.

The program instructions stored in memory 502 may further include application data 512, and for a user interface 513.

Memory 502 may also include program instructions for a additive manufacturing cloning engine 514, configured for identifying, via processor 501, a repeating design feature in a first manufacturing dataset that defines a three-dimensional workpiece. The method further includes determining, via processor 501, a processing cost or benefit for cloning the repeating design feature, and generating, via processor 501, a second dataset having with repeating design feature isolated responsive to the determined processing benefit. The program instructions may be further configured for generating, via processor 501, a third dataset from the first manufacturing dataset. The third dataset replaces the repeating design feature with a reference to the second dataset having the repeating design feature.

I/O adapter 503 can be, for example but not limited to, one or more buses or other wired or wireless connections. I/O adapter 503 may have additional elements (which are omitted for simplicity) such as controllers, microprocessors, buffers (caches), drivers, repeaters, and receivers, which may work in concert to enable communications. Further, I/O adapter 503 may facilitate address, control, and/or data connections to enable appropriate communications among the aforementioned components.

I/O adapter 503 can further include a display adapter coupled to one or more displays. I/O adapter 503 may be configured to operatively connect one or more input/output (I/O) devices 507 to computer 500. For example, I/O 503 may connect a keyboard and mouse, a touchscreen, a speaker, a haptic output device, or other output device. Output devices 507 may include but are not limited to a printer, a scanner, and/or the like. Other output devices may also be included, although not shown. Finally, the I/O devices connectable to I/O adapter 503 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some embodiments, computer 500 may include a mobile communications adapter 523. Mobile communications adapter 523 may include GPS, cellular, mobile, and/or other communications protocols for wireless communication.

In some embodiments, computer 500 can further include communications adapter 516 for coupling to a network 506.

Network 506 can be an IP-based network for communication between computer 500 and any external device. Network 506 transmits and receives data between computer 500 and devices and/or systems external to computer 500. In an exemplary embodiment, network 506 can be a managed IP network administered by a service provider. Network 506 may be a network internal to an aircraft, such as, for example, an avionics network, etc. Network 506 may be implemented in a wireless fashion, e.g., using wireless protocols and technologies, such as WiFi, WiMax, etc. Network 506 may also be a wired network, e.g., an Ethernet network, an ARINC 429 network, a controller area network (CAN), etc., having any wired connectivity including, e.g., an RS232 connection, R5422 connection, etc. Network 506 can also be a packet-switched network such as a local area network, wide area network, metropolitan area network, Internet network, or other similar type of network environment. The network 506 may be a fixed wireless network, a wireless local area network (LAN), a wireless wide area network (WAN) a personal area network (PAN), a virtual private network (VPN), intranet or other suitable network system.

Network 506 may operatively connect computer 500 to one or more devices including device 517, device 518, and device 520. Network 506 may also connect computer 500 to one or more servers such as, for example, server 519.

If computer 500 is a PC, workstation, laptop, tablet computer and/or the like, the instructions in the memory 502 may further include a basic input output system (BIOS) (omitted for simplicity). The BIOS is a set of routines that initialize and test hardware at startup, start operating system 511, and support the transfer of data among the operatively connected hardware devices. The BIOS is typically stored in ROM 510 so that the BIOS can be executed when computer 500 is activated. When computer 500 is in operation, processor 501 may be configured to execute instructions stored within the memory 502, to communicate data to and from the memory 502, and to generally control operations of the computer 500 pursuant to the instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A computer-implemented method for generating a manufacturing dataset having cloned geometric features for an additive manufacturing process comprising:

identifying, via a processor, a repeating design feature in a first manufacturing dataset that defines a three-dimensional workpiece;

removing the repeating design features from the first manufacturing dataset;

inserting a placeholder for each instance of the removed repeating design features in the first manufacturing dataset;

determining, via the processor, a processing benefit for cloning the repeating design feature;

generating, via the processor, a second dataset having with repeating design feature isolated responsive to the determined processing benefit, wherein the second dataset includes only the repeating design feature in isolation;

generating, via the processor, a third dataset from the first manufacturing dataset, wherein the third dataset replaces the repeating design feature with a reference to the second dataset having the repeating design feature to reduce a size of the first manufacturing dataset, wherein the reference to the second dataset is inserted at the placeholder, wherein a size of the reference is smaller than a size of the repeating design feature from the first manufacturing dataset; and building the three-dimensional workpiece using the third dataset.

2. The computer-implemented method of claim 1, wherein the processing benefit is based on a geometric complexity of the repeating design feature indicated by three-dimensional surface information, and the design feature is repeated in a Z-axis respective to a Cartesian coordinate system.

3. The computer-implemented method of claim 1, wherein determining the processing benefit comprises:
   determining, via the processor, a processing data requirement indicative of a volume of data storage necessary for the repeating design feature;
   generating, via the processor, a count of a number of times the repeating design feature is repeated in the first manufacturing dataset;
   evaluating, via the processor, a modified sample of the first manufacturing dataset having the repeating design feature removed; and
   comparing, via the processor, the processing benefit for cloning the repeating design feature based on the processing data requirement, the count, and the modified sample of the first manufacturing dataset.

4. The computer-implemented method of claim 1 comprising identifying, via the processor, the repeating design feature in the first manufacturing dataset based on user input indicative of the repeating design feature.

5. The computer-implemented method of claim 1, wherein generating the third dataset comprises:
   identifying, via the processor, a boundary of the three-dimensional workpiece;
   determining, via the processor, whether the repeating design feature is coterminous with an adjacent instance of the repeating design feature;
   determining an overlap distance for the repeating design feature and the adjacent instance of the repeating design feature; and
   generating, via the processor, a reference location for the reference to the second dataset having the repeating design feature based on the overlap distance responsive to determining that the repeating design feature is coterminous with the adjacent instance of the repeating design feature.

6. The computer-implemented method of claim 5, wherein the processor is configured for generating the third dataset based on one or more user inputs indicative of an additive manufacturing process, an additive manufacturing material, and a finish tolerance.

7. The computer-implemented method of claim 1 comprising identifying, via the processor, the repeating design feature in the first manufacturing dataset without user input indicative of the repeating design feature.

8. A system for generating a manufacturing dataset having cloned geometric features for an additive manufacturing process comprising a processor configured to:
   identify a repeating design feature in a first manufacturing dataset that defines a three-dimensional workpiece;
   remove the repeating design features from the first manufacturing dataset;
   insert a placeholder for each instance of the removed repeating design features in the first manufacturing dataset;
   determine a processing benefit for cloning the repeating design feature;
   generate a second dataset having the repeating design feature isolated responsive to the determined processing benefit, wherein the second dataset includes only the repeating design feature in isolation;
   generate a third dataset from the first manufacturing dataset wherein, for each instance of the repeating design feature, the third dataset replaces the repeating design feature with a reference to the second dataset having the repeating design feature to reduce a size of the first manufacturing dataset, wherein the reference to the second dataset is inserted at the placeholder, wherein a size of the reference is smaller than a size of the repeating design feature from the first manufacturing dataset; and
   provide instructions to build the three-dimensional workpiece using the third dataset.

9. The system of claim 8, wherein the processing benefit is based on a geometric complexity of the repeating design feature indicated by three-dimensional surface information, and the design feature is repeated in a Z-axis respective to a Cartesian coordinate system.

10. The system of claim 8, wherein the processor is configured to:
    determine a processing data requirement indicative of a volume of data storage necessary for the repeating design feature;
    generate a count of a number of times the repeating design feature is repeated in the first manufacturing dataset;
    evaluate a modified sample of the first manufacturing dataset having the repeating design feature removed; and
    determine the processing benefit by comparing the processing benefit for cloning the repeating design feature based on the processing data requirement, the count, and the modified sample of the first manufacturing dataset.

11. The system of claim 8 wherein the processor is configured to identify the repeating design feature in the first manufacturing dataset based on user input indicative of the repeating design feature.

12. The system of claim 8, wherein the processor is configured to:
    identify a boundary of the three-dimensional workpiece;
    determine whether the repeating design feature is coterminous with an adjacent instance of the repeating design feature;
    determine an overlap distance for the repeating design feature and the adjacent instance of the repeating design feature; and
    generate the third dataset, responsive to determining that the repeating design feature is coterminous with the adjacent instance of the repeating design feature, wherein the third dataset comprises a reference location for the reference to the second dataset having the repeating design feature based on the overlap distance.

13. The system of claim 12, wherein the processor is configured to generate the third dataset based on one or more user inputs indicative of an additive manufacturing process, an additive manufacturing material, and a finish tolerance.

14. The system of claim 8 wherein the processor is further configured to identify the repeating design feature in the first manufacturing dataset without user input indicative of the repeating design feature.

15. A computer program product for generating a manufacturing dataset having cloned geometric features for an additive manufacturing process, the computer program product comprising a non-transitory computer readable storage medium having program instructions embodied therewith, the program instructions executable by a processor to cause the processor to perform a method comprising:
    identifying a repeating design feature in a first manufacturing dataset that defines a three-dimensional workpiece;
    removing the repeating design features from the first manufacturing dataset;

inserting a placeholder for each instance of the removed repeating design features in the first manufacturing dataset;

determining a processing benefit for cloning the repeating design feature;

generating a second dataset having the repeating design feature isolated responsive to the determined processing benefit, wherein the second dataset includes only the repeating design feature in isolation;

generating a third dataset from the first manufacturing dataset wherein, for each instance of the repeating design feature, the third dataset replaces the repeating design feature with a reference to the second dataset having the repeating design feature to reduce a size of the first manufacturing dataset, wherein the reference to the second dataset is inserted at the placeholder, wherein a size of the reference is smaller than a size of the repeating design feature from the first manufacturing dataset; and providing the program instructions to build the three-dimensional workpiece using the third dataset.

16. The computer program product of claim 15, wherein the processing benefit is based on a geometric complexity of the repeating design feature indicated by three-dimensional surface information.

17. The computer program product of claim 15, wherein determining the processing benefit comprises:

determining a processing data requirement indicative of a volume of data storage necessary for the repeating design feature;

generating a count of a number of times the repeating design feature is repeated in the first manufacturing dataset;

evaluating a modified sample of the first manufacturing dataset having the repeating design feature removed; and comparing the processing benefit for cloning the repeating design feature based on the processing data requirement, the count, and the modified sample of the first manufacturing dataset.

18. The computer program product of claim 15 comprising identifying the repeating design feature in the first manufacturing dataset based on user input indicative of the repeating design feature.

19. The computer program product of claim 15, wherein generating the third dataset comprises:

identifying a boundary of the three-dimensional workpiece;

determining whether the repeating design feature is coterminous with an adjacent instance of the repeating design feature;

determining an overlap distance for the repeating design feature and the adjacent instance of the repeating design feature; and generating a reference location for the reference to the second dataset having the repeating design feature based on the overlap distance responsive to determining that the repeating design feature is coterminous with the adjacent instance of the repeating design feature.

20. The computer program product of claim 19, wherein the processor is configured for generating the third dataset based on one or more user inputs indicative of an additive manufacturing process, an additive manufacturing material, and a finish tolerance.

* * * * *